July 5, 1938.  W. FEIGLEY  2,123,102
HYDRAULIC EQUALIZER FOR AUTOMOBILE MECHANICAL BRAKES
Filed Jan. 5, 1937  2 Sheets-Sheet 1
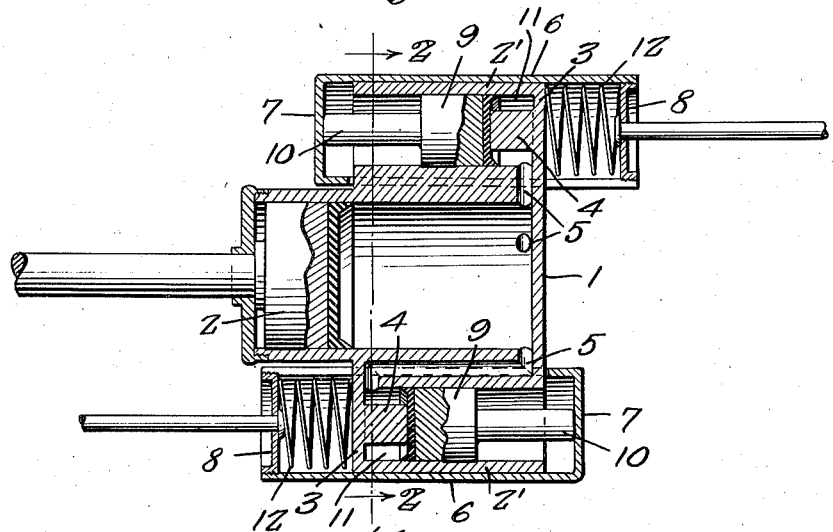
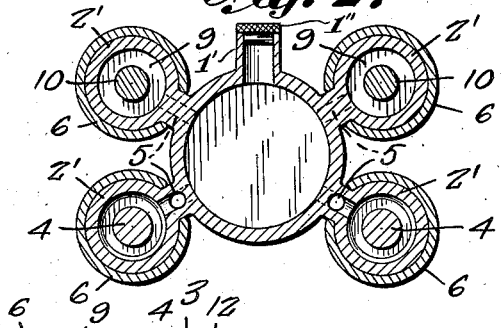
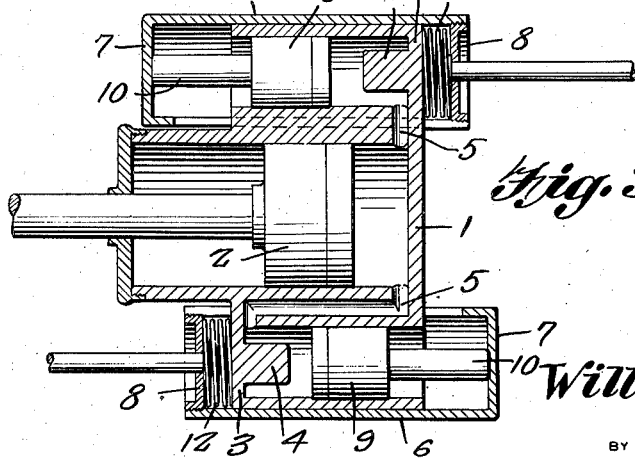
William Feigley,
INVENTOR
BY Victor J. Evans & Co.
ATTORNEYS July 5, 1938. W. FEIGLEY 2,123,102
HYDRAULIC EQUALIZER FOR AUTOMOBILE MECHANICAL BRAKES
Filed Jan. 5, 1937 2 Sheets-Sheet 2
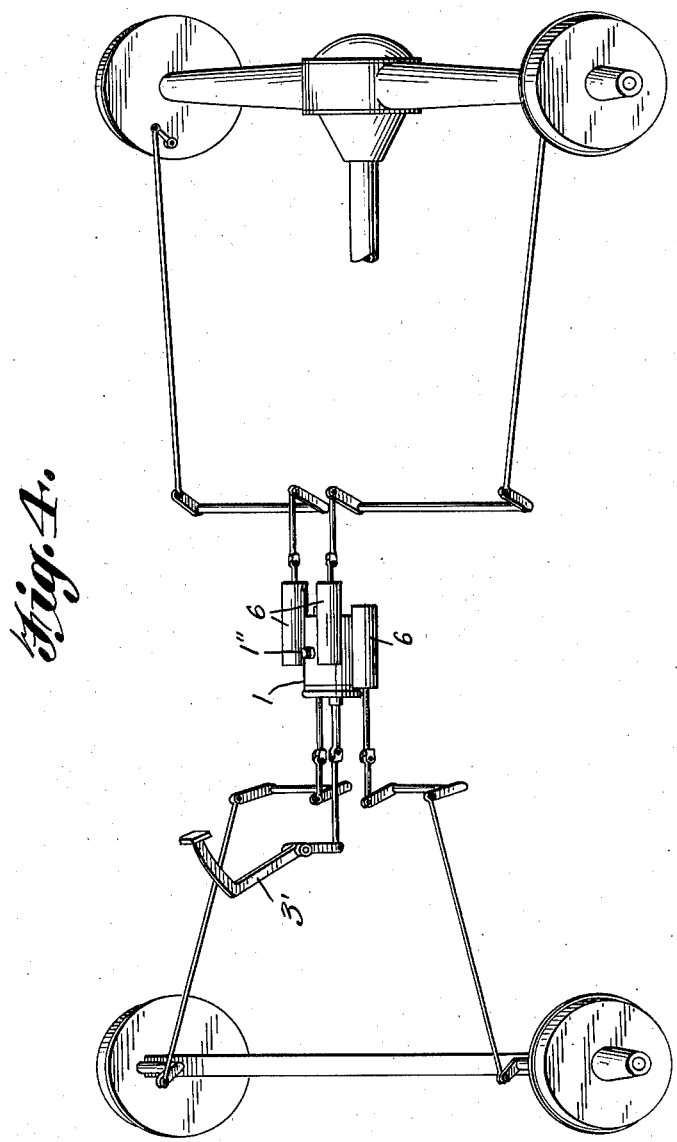

Patented July 5, 1938

2,123,102

UNITED STATES PATENT OFFICE 2,123,102

HYDRAULIC EQUALIZER FOR AUTOMOBILE MECHANICAL BRAKES

William Feigley, Bremerton, Wash.

Application January 5, 1937, Serial No. 119,165

2 Claims. (Cl. 188—204)

This invention relates to hydraulic equalizers for mechanical brakes and has for the primary object the provision of a device of this character which may be readily adapted to a brake rigging of mechanical brakes of a motor vehicle and which will assure equal application of each brake to reduce skidding of the vehicle to a minimum and eliminate one of the causes of uneven wearing of the tires of said vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a fragmentary horizontal sectional view showing a hydraulic equalizer for mechanical brakes of motor vehicles constructed in accordance with my invention.

Figure 2 is a transverse sectional view taken on the line 2—2 of Figure 1.

Figure 3 is a fragmentary horizontal sectional view showing the parts of this invention as positioned during the application of the brakes.

Figure 4 is a diagrammatical view showing my invention connected to a brake mechanism of a vehicle.

Referring in detail to the drawings, the numeral 1 indicates a master cylinder in which is reciprocally mounted a master piston 2 and is provided with a filling neck 1′ normally closed by a removable plug 1″ to permit the master cylinder to be filled with a fluid. This piston or the stem thereof is connected to a brake operating means 3′ of a motor vehicle so that the piston 2 may be manually reciprocated. Formed on the master piston 1 and parallelling the latter are internal sleeves 2′, one for each brake mechanism of a motor vehicle, the brake mechanism meaning the brake shoes and similar parts associated with the wheels of the vehicle, as shown in Figure 4. One end of each sleeve is closed by a wall 3 on which is formed an abutment 4. Ports or passages 5 communicate the interior of the sleeves 2′ with one end of the master cylinder. External sleeves 6 are slidably mounted on the internal sleeves 2′ and each has an integral end wall 7 and a removable end wall 8 to which is suitably connected the wheel brake mechanism of the motor vehicle. Pistons 9 are located within the inner sleeves and the stems 10 thereof abut the end walls 7 of the external sleeves. The pistons 9 and walls of the internal sleeves and the end walls 3 of the latter form fluid chambers 11 communicating with the master cylinder by the ports or passages 5. The abutments 4 are arranged in the fluid chambers 11. Coil springs 12 are interposed between the removable end walls of the external sleeves and the end walls 3 of the internal sleeves for the purpose of bringing about movement of the external sleeves to place the brakes in off position and to expel fluid from the fluid chambers 11 to the master cylinder when the brake operating means is in an off position.

In operation, to apply even pressure to the brakes of the motor vehicle the piston 2 is moved to the right in Figure 1 displacing fluid from the master cylinder to the fluid chambers 11. The fluid acts in the chambers 11 to move the external sleeves endwise so that the brakes of the front and rear wheels of the motor vehicle will be applied evenly.

It is to be noted that the arrangement of the external and internal sleeves is such that the external sleeves of one pair may be connected to the brakes of the rear wheels of the vehicle and the external sleeves of the other pair may be connected to the front brakes of the vehicle.

Having described the invention, I claim:

1. A hydraulic equalizer comprising a master cylinder, a manually operated piston in said cylinder, internal sleeves carried by said master cylinder, external sleeves slidable on the internal sleeves and connected to brakes of a motor vehicle, and pistons located in the inner sleeves and engaging the outer sleeves to form within said inner sleeves fluid chambers, said master cylinder having ports communicating the latter with the fluid chambers of said inner sleeves.

2. A hydraulic equalizer comprising a master cylinder, a manually operated piston in said cylinder, internal sleeves carried by said master cylinder, external sleeves slidable on the internal sleeves and connected to brakes of a motor vehicle, pistons located in the inner sleeves and engaging the outer sleeves to form within said inner sleeves fluid chambers, said master cylinder having ports communicating the latter with the fluid chambers of said inner sleeves, and coil springs interposed between the inner and outer sleeves working in opposition to the fluid pressure in the inner sleeves from the master cylinder.

WILLIAM FEIGLEY.